United States Patent [19]
Nomura et al.

[11] 4,072,236
[45] Feb. 7, 1978

[54] ARTICLE TRANSFER APPARATUS
[75] Inventors: Kenji Nomura, Aichi; Kengo Yoshioka; Toshihiro Goto, both of Kariya, all of Japan
[73] Assignee: Toyoda-Koki Kabushiki-Kaisha, Kariya, Japan
[21] Appl. No.: 762,668
[22] Filed: Jan. 26, 1977
[30] Foreign Application Priority Data
Feb. 25, 1976 Japan .................. 51-20340
[51] Int. Cl.² ............................. B65G 47/90
[52] U.S. Cl. .............................. 214/1 BB; 214/1 BD; 294/88
[58] Field of Search .............. 214/14 TT, 1 R, 1 B, 214/1 BB, 1 BC, 1 BD, 1 R; 294/115, 87.2, 87.22, 87.24, 88, 89

[56] References Cited
U.S. PATENT DOCUMENTS

| 2,974,811 | 3/1961 | Dammert et al. | 214/1 BC |
| 3,034,822 | 5/1962 | Eldreo | 294/115 X |
| 3,760,958 | 9/1973 | Lohneis | 214/1 BD |
| 3,968,885 | 7/1976 | Hassan et al. | 214/1 BC |

FOREIGN PATENT DOCUMENTS

| 4,743,273 | 11/1972 | Japan | 214/1 BD |
| 247,486 | 11/1969 | U.S.S.R. | 294/89 |

Primary Examiner—Frank E. Werner
Attorney, Agent, or Firm—Oblon, Fisher, Spivak, McClelland & Maier

[57] ABSTRACT

An article transfer apparatus is provided in which a transfer arm, having a pair of pivotable grippers on each of its ends, is fixedly mounted upon one end of a shaft, extending radially therefrom, the shaft being supported so as to be rotatable and axially movable by actuators. The apparatus further comprises a wedge member movable axially of the shaft for simultaneously operating the pairs of grippers, the wedge member being supported to be floatable radially of the shaft, so that reliable gripping actions are effected on both pairs of grippers.

11 Claims, 3 Drawing Figures

ARTICLE TRANSFER APPARATUS

BACKGROUND OF THE INVENTION

1. Field of the Invention

The present invention relates generally to an article transfer apparatus, and more particularly to such an apparatus being provided with a pair of grippers at each of the ends of a rotatable transfer arm for simultaneously gripping and mutually replacing two articles.

2. Description of the Prior Art

Heretofore, as transfer apparatus of the above type, there has been known an apparatus in which power actuators are respectively provided on both ends of a transfer arm. In such apparatus, however, the rotational movement of the transfer arm is apt to allow the grippers to open, whereby the articles will fall therefrom due to the centrifugal force which acts upon the articles during such rotational movement. Additionally, other problems exist, such as the possible operation of the two power actuators with a time difference, and further that operations of the actuators are too difficult to detect.

Another apparatus has also been known in which one power actuator is used to actuate both sets of grippers provided on the ends of the transfer arm. In this apparatus, however, when a difference is present between the diameters of the gripped portions of two articles to be gripped, a tight grip is effected on the larger one while a loose grip is effected on th smaller one. For this reason, it is impossible for the apparatus to reliably hold the articles during the transfer operation.

SUMMARY OF THE INVENTION

It is therefore an object of the present invention to provide an improved article transfer apparatus of the type characterized herein in which the grippers are positively prevented from opening during a transfer operation, so as to thereby prevent articles from falling therefrom.

Another object of the invention is to provide an apparatus of the type characterized herein which is capable of reliably gripping two articles, depending upon one power actuator, even if a difference is present between the diameters of the gripped portions of the articles.

A further object of the present invention is to provide an improved article transfer apparatus with a gripper actuation mechanism which is appropriate for gripping, in a reliable and quick manner, two articles, each having a flanged cylindrical gripping portion.

Briefly, according to the present invention, there is provided a transfer apparatus which comprises a shaft rotatable upon a main body, a transfer arm being fixedly provided upon one end of the shaft and extending radially therefrom, the transfer arm having a pair of pivotable grippers at each of the ends for simultaneously gripping two articles. A wedge member is supported at the one end of the shaft to be movable axially of and floatable radially of the shaft, connecting devices being responsive to the axial movement of the wedge member to selectively open and close the pairs of grippers, and first and second actuators being provided for respectively rotating and axially moving the shaft and the wedge member.

In another aspect of the invention, the connecting devices are appropriate for the articles to be transferred, each of the articles having a flanged cylindrical gripping portion, and are arranged to open the pairs of grippers to the extent that removal of an article from a pair of the grippers is not allowed, because of the provision of the flanges, when the article is axially moved, but is allowed when the article is radially moved.

BRIEF DESCRIPTION OF THE DRAWINGS

Various other objects, features and attendant advantages of the present invention will be more fully appreciated as the same becomes better understood by reference to the following detailed description of preferred embodiments thereof when considered in connection with the accompanying drawings, in which.

DETAILED DESCRIPTION OF THE PREFERRED EMBODIMENTS

Figure 1:
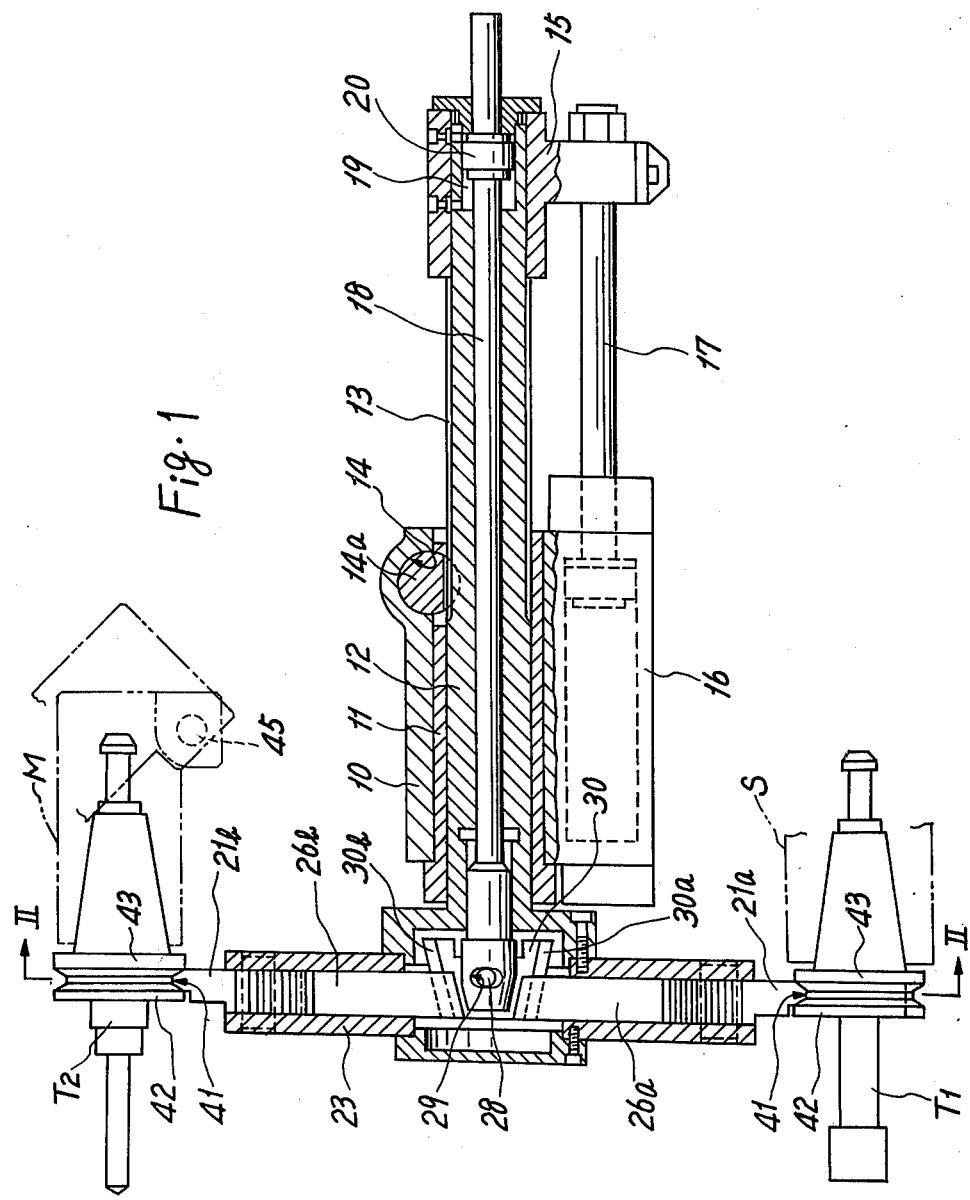
FIG. 1 is a cross-sectional view of an article transfer apparatus constructed according to the present invention.

Referring now to the drawings wherein like reference numerals designate like or corresponding parts throughout the several views, and more particularly to FIG. 1 thereof, the reference numberal 10 denotes a main body of the apparatus, by which a hollow shaft 12 is supported through a bearing bush 11 to be rotatable and axially movable. Formed on the hollow shaft 12 is an axially widened gear portion 13, with which a piston-rack 14a of a rotational actuator 14, such as a cylinder device, is operatingly meshed. The rear end of the shaft 12 is connected with a connecting block 15 to be rotatable relative thereto, and the block 15 is, in turn, fixedly connected with a piston rod 17 of a linear motion cylinder device 16. A shiftable rod 18 is co-axially guided within the hollow shaft 12, to be axially shiftable therein, and is integrally provided with a piston 20 slidably contained within a clamp cylinder 19, which is formed at the rear end of the hollow shaft 12.

Figure 2:
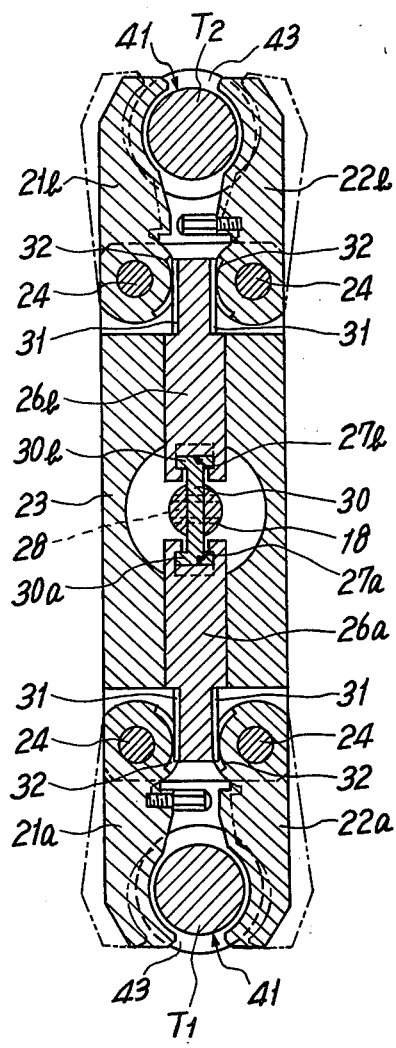
FIG. 2 is a longitudinal-sectional view of the apparatus, taken along the line II—II of FIG. 1.

A transfer arm 23 is fixedly mounted upon the forward end of the hollow shaft 12, itself extending radially of the shaft 12, and pairs of gripping claws or grippers 21, 22a, 21b and 22b for simultaneously gripping two articles to be transferred are pivotably supported through pivot shafts 24 at both ends of the transfer arm 23. In this particular embodiment, the articles are tools or tool holders T1, T2, each having a gripping portion defined by one cylindrical surface 41 and two flanges 42, 43 on either side thereof. Furthermore, within the transfer arm 23, a pair of sliders 26a and 26b are guided to be slidable toward and away from each other in the radial direction of the hollow shaft 12. These sliders are formed at the inner ends thereof with T-slots 27a, 27b, as best shown in FIG. 2, which are inclined with respect to the axis of the shiftable rod 18, and with which two T-shaped wedge action portions 30a and 30b formed upon a wedge member 30 are snugly and slidably engaged, respectively. A support pin 28 is provided, being perforated through the wedge member 30, and is engaged at both ends thereof with radially elongated holes 29 provided upon a yoke portion of the shiftable rod 18, so that the wedge member 30 is floatable radially of the shiftable rod 18.

In order to connect the sliders 26a, 26b, respectively, with the pairs of grippers 21a, 22a, 21b, 22b, motion conversion or connection mechanisms are provided therebetween. As these mechanisms, pairs of rack portions 31 are formed upon the outer ends of the sliders 26a, 26 b to be meshed with sector gears 32, which are provided, respectively, upon the grippers 21a, 22a, 21b, 22b.

Figure 3:
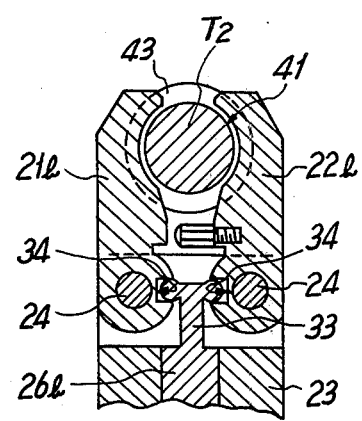
FIG. 3 is a fragmental, longitudinal-sectional view of another grip mechanism used in place of those shown in FIG. 2.

FIG. 3 illustrates another embodiment used in substitution for each of the above-described connection mechanisms. In this embodiment, a T-shaped protrusion 33 extends from the outer end of each of the sliders 26a, 26b and is engaged with cutouts 34 and 34, which are provided on each pair of the grippers 21a, 22a, 21b, 22b.

The operation of the apparatus constructed as above will now be described, on the assumption that the apparatus is used to exchange a previously used tool T1, received within a machine tool spindle S, with a fresh tool T2, received within a tool magazine socket M. In the homed or original condition, the piston 20 is at the advanced end, so that the pairs of grippers 21a, 22a, 21b, 22b are maintained opened, as indicated by the phantom lines in FIG. 2, to thereby release the tools T1, T2. When the spindle S completes a machining operation with the tool T1, the piston 20 is retracted to move the shiftable rod 18, together with the wedge member 30, rightward as seen in FIG. 1. The sliders 26a, 26b, engaging with the wedge member 30, are thus moved toward each other in the radial direction of the shiftable rod 18 within the transfer arm 23 so as to close the pairs of grippers 21a, 22a, 21b, 22b engaged with the rack portions 31, whereby the tools T1, T2 are simultaneously gripped. In this event, if a difference is present between the diameters of the gripped portions of the tools T1, T2, when either pair of grippers, e.g., 21b, 22b, comes into contact with the tool T2 having a larger diameter, that pair is then prevented from further closing, by the counteraction of which the wedge member 30 is then floatingly moved. This floating movement of the wedge member 30 permits the other pair of the grippers, in this case, 21a, 22a, to further close to come into contact with the other tool T1, so that it becomes possible to reliably grip both the tools T1, T2.

Thereafter, the cylinder device 16 is operated to advance leftward the transfer arm 23, along with the connection block 15 and the hollow shaft 12 and, as a result, the tools T1, T2 are removed from the tool spindle S and the magazine socket M. The rotational actuator 14 is subsequently operated to move the piston-rack 14a, thereby rotating the transfer arm 23, together with the hollow shaft 12, through an angle of 180°, and then, the cylinder device 16 is reversely operated, whereby the tools T1 and T2 are inserted, respectively, into the magazine socket M and the tool spindle S. After the tool insertion, the piston 20 is advanced to open the pairs of grippers 21a, 22a, 21b, 22b, and a series of the foregoing tool exchange cycles are therefore completed.

It will be realized from FIG. 2 that each pair of grippers 21a, 22a, 21b, 22b, even when opened perfectly, as indicated by the phantom lines, will hardly allow axial movement of the tool, because of the interference made with the flanges 42, 43 of the tool. To this end, the magazine socket M is upwardly pivotably supported by means of a pin 45. Accordingly, the tool T1, which has been restored within the magazine socket M, is thereafter upwardly pivoted, together with the socket M, to such a position as to be inclined at an angle of 45°. Another magazine socket, receiving another fresh tool, is then selectively positioned by a well-known tool index device disposed immediately above the grippers 21a, 22a and is downwardly pivoted to place the fresh tool into the grippers 21a, 22a in a parallel relation with the hollow shaft 12, the tool thus awaiting the next tool exchange operation.

As stated above, according to the invention, there is provided a transfer apparatus in which a wedge member is incorporated into the gripper actuation mechanisms. As the slide-resistive characteristic of the wedge member can positively prevent the grippers from being opened yieldingly due to centrifugal force acting upon articles to be transferred, it is possible to prevent the articles from falling during the transfer operation. Moreover, as the wedge member is supported to be floatable, the difference between the diameters of the articles to be gripped is absorbed through the floating movement of the wedge member, so that two articles, even of differing diameters, as previously discussed, can be gripped with high reliability.

In addition, the gripper actuation mechanisms are arranged to open the pairs of grippers only to such an extent as to hardly allow axial movement of the articles released therefrom. Therefore, the grip actions of the grippers can be quickly carried out, and this desirably results in reducing article transfer time.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An article transfer apparatus comprising in combination:
   a main body;
   a rotatable shaft rotatably supported by said main body;
   first actuation means for rotating said rotatable shaft;
   a transfer arm fixedly provided upon one end of said rotatable shaft and extending radially therefrom;
   a pair of grippers pivotably provided, respectively, upon each end of said transfer arm so as to simultaneously grip two articles to be transferred;
   a wedge member supported at said one end of said rotatable shaft and axially movable relative thereto, said wedge member also being movable floatingly radially of said rotatable shaft;
   second actuation means for moving said wedge member axially of said rotatable shaft; and
   motion connection means provided upon said transfer arm and mechanically responsive to the axial movement of said wedge member to selectively open and close said pairs of grippers.

2. An apparatus as set forth in claim 1, wherein said rotatable shaft is a hollow shaft further supported to be movable axially, and further comprising:
   a shiftably rod axially shiftable provided within said hollow shaft to support at one end thereof said wedge member and connected with said second actuation means; and
   third actuation means for axially moving said hollow shaft.

3. An apparatus as set forth in claim 2, wherein said connection means comprises a pair of sliders guided within said transfer arm to be slidable to and away from each other in a radial direction of said hollow shaft, and wherein said wedge member has a pair of wedge action portions inclined with respect to the axis of said hollow shaft so as to slide said sliders to and away from each other.

4. An apparatus as set forth in claim 3, wherein said sliders are formed, respectively, with T-slots at inner ends thereof, and wherein said wedge action portions have T-cross sections which are engaged with said T-slots, respectively.

5. An apparatus as set forth in claim 4, wherein said connection means further comprises rack-pinion mechanisms for converting the slide movements of said sliders to pivotal movements of said grippers.

6. An apparatus as set forth in claim 5, further comprising a pin provided upon said wedge member and engaged with a radially elongated hole formed upon said one end of said shiftable rod, so as to thereby allow relative movement of said wedge member with said shiftable rod only in the radial direction thereof.

7. An apparatus as set forth in claim 4, wherein said connection means further comprises T-shaped protrusions protruding from the outer end of each of said sliders and engaged with cutouts which are respectively formed upon each pair of said grippers.

8. An apparatus as set forth in claim 4, wherein each of said articles has a gripping portion including a cylindrical surface and at least two flanges formed on either side of said cylindrical surface, and wherein said connection means is arranged to open said pairs of grippers only to an extent that a removal of said article from each pair of said grippers is not allowed because of the provision of said flanges when said article is axially moved, but is allowed when said article is radially moved.

9. An apparatus as set forth in claim 8, wherein said connection means further comprises rack-pinion mechanisms for converting the slide movements of said sliders to pivotal movements of said grippers.

10. An apparatus as set forth in claim 8, wherein said connection means further comprises T-shaped protrusions protruding from the outer end of each of said sliders and engaged with cutouts which are respectively formed upon each pair of said grippers.

11. An apparatus as set forth in claim 1, wherein each of said articles has a gripping portion including a cylindrical surface and at least two flanges formed on either side of said cylindrical surface, and wherein said connection means is arranged to open said pairs of grippers only to an extent that a removal of said article from each pair of said grippers is not allowed because of the provision of said flanges when said article is axially moved, but is allowed when said article is radially moved.

* * * * *